United States Patent
Matsubara et al.

(10) Patent No.: US 12,247,657 B2
(45) Date of Patent: Mar. 11, 2025

(54) SHIFT DEVICE AND VEHICLE ELECTRONIC CONTROL UNIT

(71) Applicant: AISIN CORPORATION, Aichi (JP)

(72) Inventors: Masaru Matsubara, Kariya (JP); Motofumi Miyake, Kariya (JP); Kazunori Takagi, Kariya (JP)

(73) Assignee: AISIN CORPORATION, Aichi (JP)

( * ) Notice: Subject to any disclaimer, the term of this patent is extended or adjusted under 35 U.S.C. 154(b) by 155 days.

(21) Appl. No.: 18/015,908

(22) PCT Filed: Oct. 19, 2021

(86) PCT No.: PCT/JP2021/038567
§ 371 (c)(1),
(2) Date: Jan. 12, 2023

(87) PCT Pub. No.: WO2022/085673
PCT Pub. Date: Apr. 28, 2022

(65) Prior Publication Data
US 2023/0279945 A1    Sep. 7, 2023

(30) Foreign Application Priority Data
Oct. 23, 2020   (JP) .................................. 2020-178032

(51) Int. Cl.
*H02P 23/18* (2016.01)
*F16H 61/32* (2006.01)

(52) U.S. Cl.
CPC .......... *F16H 61/32* (2013.01); *H02P 23/183* (2016.02); *F16H 2061/326* (2013.01); *H02P 2201/07* (2013.01)

(58) Field of Classification Search
CPC .............. H02P 23/183; H02P 2201/07; F16H 2061/326; F16H 61/32
See application file for complete search history.

(56) References Cited

U.S. PATENT DOCUMENTS 5,801,498 A  *  9/1998  Kusano ................. B60L 3/0023
                                                  318/442
6,930,460 B2 *  8/2005  Ishikawa ................ B60L 50/61
                                                  318/108
(Continued)

FOREIGN PATENT DOCUMENTS

| JP | 2006-273046 A | 10/2006 |
| JP | 2007-271011 A | 10/2007 |

(Continued)

OTHER PUBLICATIONS

International Search Report for PCT/JP2021/038567 dated Jan. 18, 2022 [PCT/ISA/210].

*Primary Examiner* — Rina I Duda
(74) *Attorney, Agent, or Firm* — Sughrue Mion, PLLC

(57) ABSTRACT

A shift device includes: a motor drive circuit; a motor driver unit for driving the motor drive circuit; a control unit that controls the motor driver unit; a motor power supply path; a system power supply path; and a buck-boost unit that converts electric power supplied from the system power supply path to a predetermined voltage and outputs the voltage. Electric power is supplied to the control unit via the buck-boost unit, and either the electric power from the motor power supply path or the electric power from the system power supply path is supplied to the motor driver unit based on a voltage.

7 Claims, 3 Drawing Sheets

(56) References Cited

U.S. PATENT DOCUMENTS

| | | | | |
|---|---|---|---|---|
| 7,227,332 | B2* | 6/2007 | Suzuki | B60L 3/0023 |
| | | | | 180/65.265 |
| 8,543,271 | B2* | 9/2013 | Yamamoto | B60W 10/26 |
| | | | | 180/65.265 |
| 8,880,260 | B2* | 11/2014 | Nakagawara | B60T 13/746 |
| | | | | 701/22 |
| 2019/0061653 | A1* | 2/2019 | Takahashi | B60L 53/20 |

FOREIGN PATENT DOCUMENTS

| | | |
|---|---|---|
| JP | 2017-149265 A | 8/2017 |
| JP | 2019-152316 A | 9/2019 |
| WO | 2017/051812 A1 | 3/2017 |
| WO | 2019/022148 A1 | 1/2019 |

* cited by examiner

SHIFT DEVICE AND VEHICLE ELECTRONIC CONTROL UNIT

CROSS REFERENCE TO RELATED APPLICATIONS

This application is a National Stage of International Application No. PCT/JP2021/038567 filed Oct. 19, 2021, claiming priority based on Japanese Patent Application No. 2020-178032, the entire contents of which are incorporated herein by reference.

TECHNICAL FIELD

The present disclosure relates to shift devices mounted on vehicles and vehicle electronic control units.

BACKGROUND ART

Conventionally, power supply control systems are known that are used in brake-by-wire that controls brakes of a vehicle based on electrical signals. Such a power supply control system is disclosed in, for example, Japanese Unexamined Patent Application Publication No. 2006-273046 (JP 2006-273046 A).

JP 2006-273046 A discloses a power supply control system including: a first power supply; a second power supply; and an electrically operated device that is driven by electric power supplied from the first power supply or the second power supply and that controls a pump and a motor that operate brakes of the vehicle.

Although not clearly described in JP 2006-273046 A, shift-by-wire is known as a by-wire system (system that controls a controlled object based on an electrical signal) other than brake-by-wire that controls the brakes of the vehicle based on an electrical signal. In shift-by-wire, a motor drive circuit (switching unit) is controlled based on an electrical signal to operate the motor, thereby driving a speed change mechanism and switching the shift position (shift range). In such shift-by-wire, an auxiliary battery and a backup power supply (failsafe power supply) are provided as power supplies, so that electric power is supplied from the backup power supply if an abnormality occurs in the auxiliary battery.

In shift-by-wire, a motor power supply path for supplying electric power (power supply) to the motor for driving the speed change mechanism is provided as a power supply path different from a system power supply path for supplying electric power (power supply) to a control unit for performing control for switching the shift position, various sensors, etc. In shift-by-wire, conventionally, the electric power from the motor power supply path is supplied to the sources or drains of switching elements included in the motor drive circuit (switching unit) for controlling the operation of the motor, and the electric power from the system power supply path is supplied to the gates of the switching elements included in the motor drive circuit (switching unit) (gate drive circuit) and the control unit.

RELATED ART DOCUMENTS

Patent Documents

Patent Document 1: Japanese Unexamined Patent Application Publication No. 2006-273046 (JP 2006-273046 A)

SUMMARY OF THE DISCLOSURE

Problem to be Solved by Various Aspects of the Disclosure

However, when electric power is being supplied from the backup power supply to the system power supply path and the motor power supply path, the voltage in the motor power supply path may increase due to the regenerative power of the motor. When the voltage in the motor power supply path increases with respect to the voltage in the system power supply path, the output voltage of the gate drive circuit becomes less than the gate drive voltage required to drive the switching elements included in the switching unit due to the potential difference between the electric power that is supplied to the switching unit and the electric power that is supplied to the gate drive circuit. That is, the gate drive voltage cannot be ensured. As a result, there is a problem that the switching unit for controlling the operation of the motor cannot be driven when the voltage in the motor power supply path increases with respect to the voltage in the system power supply path.

The present disclosure was made to solve the above problem, and it is one aspect of the present disclosure to provide a shift device and an electronic control unit that can drive a switching unit for controlling the operation of a motor even when the voltage in a motor power supply path increases with respect to the voltage in a system power supply path.

Means for Solving the Problem

In order to achieve the above aspect, a shift device according to a first aspect of the disclosure includes: a switching unit that controls operation of a motor that drives a speed change mechanism; a motor driver unit for driving the switching unit; a control unit that controls the motor driver unit; a motor power supply path that supplies electric power to the switching unit; a system power supply path that supplies electric power to the control unit; and a buck-boost unit that is provided in the system power supply path and that converts the electric power supplied from the system power supply path to a predetermined voltage and output the voltage. Electric power is supplied to the control unit via the buck-boost unit, and either the electric power from the motor power supply path or the electric power from the system power supply path is supplied to the motor driver unit based on a voltage.

In the shift device according to the first aspect of the disclosure, as described above, either the electric power from the motor power supply path or the electric power from the system power supply path is supplied to the motor driver unit for driving the switching unit, based on the voltage. Accordingly, by supplying the electric power from the motor power supply path to the motor driver unit, the electric power from the motor power supply path is supplied to both the switching unit and the motor driver unit. Therefore, even when the voltage in the motor power supply path that supplies electric power to the switching unit increases with respect to the voltage in the system power supply path that supplies electric power to the control unit, both the voltage of the electric power that is supplied to the switching unit and the voltage of the electric power that is supplied to the motor driver unit increase. The possibility that a potential difference may occur between the electric power that is supplied to the switching unit and the electric power that is supplied to the motor driver unit can thus be reduced. As a result, the switching unit that controls the operation of the motor can be driven even when the voltage in the motor power supply path that supplies electric power to the switching unit increases with respect to the voltage in the system power supply path that supplies electric power to the control unit.

In the case where a pre-driver IC that outputs a gate drive signal for driving the switching unit is used in the motor driver unit, settings for shift switch control are written and held in a register inside the IC of the pre-driver IC. However, when the supply of electric power (power supply) to the motor driver unit stops and the motor driver unit stops operating, the settings in the register will be reset. Therefore, when the supply of electric power (power supply) to the motor driver unit stops, an abnormality such as a failure in communication with the control unit occurs due to the settings in the register being reset. In this respect, in the shift device according to the first aspect of the present disclosure, as described above, either the electric power from the motor power supply path or the electric power from the system power supply path is supplied to the motor driver unit based on the voltage. Therefore, even if an abnormality occurs in one of the power supply paths, electric power can be supplied to the motor driver unit from the other power supply path. As a result, the motor driver unit can be kept operating even if an abnormality occurs in one of the power supply paths. Therefore, an abnormality can be prevented from occurring in the motor driver unit due to the motor driver unit being reset.

In the shift device according to the first aspect, preferably, the shift device is a shift-by-wire shift device for a vehicle, and either the electric power from the motor power supply path or the electric power output from the buck-boost unit is supplied to the motor driver unit based on the voltage.

With this structure, either the electric power from the motor power supply path or the electric power output from the buck-boost unit is supplied to the motor driver unit based on the voltage. Accordingly, by supplying the electric power output from the buck-boost unit to the motor driver unit, the electric power supplied from the system power supply path can be supplied to both the motor driver unit and the control unit via the buck-boost unit. As a result, the shift-by-wire shift device for a vehicle can be provided that can keep both the motor driver unit and the control unit operating even when a momentary power interruption (phenomenon in which supply of electric power is momentarily interrupted) occurs in the motor power supply path.

In this case, preferably, when a first voltage in the motor power supply path is higher than a second voltage output from the buck-boost unit, the electric power from the motor power supply path is supplied to the motor driver unit.

With this structure, when the first voltage in the motor power supply path is higher than the second voltage output from the buck-boost unit, the electric power from the motor power supply path is supplied to the motor driver unit. Therefore, when the first voltage in the motor power supply path is higher than the second voltage output from the buck-boost unit, the first voltage from the motor power supply path is supplied to the switching unit and the motor driver unit. Therefore, even when the first voltage in the motor power supply path increases and the first voltage in the motor power supply path becomes higher than the second voltage output from the buck-boost unit, the electric power of the first voltage from the motor power supply path is supplied to the switching unit and the motor driver unit. Since the voltage of the electric power that is supplied to the motor driver unit thus increases with the voltage of the electric power that is supplied to the switching unit, the possibility that a potential difference may occur between the electric power that is supplied to the motor driver unit and the electric power that is supplied to the switching unit can be easily reduced. As a result, the switching unit that controls the operation of the motor can be easily driven even when the first voltage in the motor power supply path becomes higher than the second voltage output from the buck-boost unit.

In the structure in which the electric power from the motor power supply path is supplied to the motor driver unit when the first voltage in the motor power supply path is higher than the second voltage output from the buck-boost unit, preferably, electric power converted to the second voltage by the buck-boost unit is supplied to the motor driver unit when the first voltage in the motor power supply path is lower than the second voltage output from the buck-boost unit.

With this structure, when the first voltage in the motor power supply path is lower than the second voltage output from the buck-boost unit, the electric power converted to the second voltage by the buck-boost unit is supplied to the motor driver unit. Therefore, it is possible to keep supplying the electric power to the motor driver unit even when the first voltage in the motor power supply path drops due to a momentary power interruption (phenomenon in which supply of electric power is momentarily interrupted) etc. As a result, the motor driver unit can be kept operating even when the supply of electric power from the motor power supply path stops due to a momentary power interruption etc. Therefore, an abnormality can be prevented from occurring in the motor driver unit due to the motor driver unit being reset.

In the shift device according to the first aspect, preferably, the motor power supply path and an output side of the buck-boost unit are connected to each other via a diode, the diode includes a first diode provided in the motor power supply path and a second diode provided on the output side of the buck-boost unit, and either the electric power from the motor power supply path and via the first diode or the electric power output from the buck-boost unit and via the second diode is supplied to the motor driver unit via the diode based on the voltage.

With this structure, a diode-OR circuit can be formed by the first diode provided in the motor power supply path and the second diode provided on the output side of the buck-boost unit. Therefore, the electric power to be supplied to the motor driver unit can be switched based on the magnitude of the voltage without separately providing a switching circuit etc. for switching the electric power to be supplied to the motor driver unit. As a result, the circuit structure is less likely to be complicated as compared to the case where a switching circuit etc. for switching the electric power to be supplied to the motor driver unit is provided separately.

In the shift device according to the first aspect, preferably, a current path for supplying electric power from a power supply outside the device branches inside the device into the motor power supply path and the system power supply path.

With this structure, unlike the case where the current path for supplying the electric power from the power supply outside the device branches outside the device into the motor power supply path and the system power supply path, terminals for inputting the electric power from the power supply outside the device need not be provided for each of the motor power supply path and the system power supply path. As a result, an increase in number of parts can be reduced.

In order to achieve the above aspect, a vehicle electronic control unit according to a second aspect of the present disclosure includes: a switching unit that controls operation of a motor; a motor driver unit for driving the switching unit; a control unit that controls the motor driver unit; a motor power supply path that supplies electric power to the switching unit; a system power supply path that supplies electric power to the control unit; and a buck-boost unit that is provided in the system power supply path and that converts the electric power supplied from the system power supply path to a predetermined voltage and output the voltage. Electric power is supplied to the control unit via the buck-boost unit, and at least either the electric power from the motor power supply path or the electric power from the system power supply path is supplied to the motor driver unit based on a voltage.

In the vehicle electronic control unit according to the second aspect of the present disclosure, as described above, either the electric power from the motor power supply path or the electric power from the system power supply path is supplied to the motor driver unit based on the voltage. Accordingly, by supplying the electric power from the motor power supply path to the motor driver unit, the electric power from the motor power supply path is supplied to both the switching unit and the motor driver unit. Therefore, even when the voltage in the motor power supply path that supplies electric power to the switching unit increases with respect to the voltage in the system power supply path that supplies electric power to the control unit, both the voltage of the electric power that is supplied to the switching unit and the voltage of the electric power that is supplied to the motor driver unit increase. Therefore, the possibility that a potential difference may occur between the electric power that is supplied to the switching unit and the electric power that is supplied to the motor driver unit can be reduced. As a result, the vehicle electronic control unit can be provided that can drive the switching unit and control the operation of the motor even when the voltage in the motor power supply path that supplies electric power to the switching unit increases with respect to the voltage in the system power supply path that supplies electric power to the control unit.

In the vehicle electronic control unit according to the second aspect of the present disclosure, as described above, either the electric power from the motor power supply path or the electric power from the system power supply path is supplied to the motor driver unit based on the voltage. Therefore, even if an abnormality occurs in one of the power supply paths, electric power can be supplied to the motor driver unit from the other power supply path. As a result, the motor driver unit can be kept operating even if an abnormality occurs in one of the power supply paths. Therefore, the vehicle electronic control unit can be provided that can prevent an abnormality from occurring in the motor driver unit due to the motor driver unit being reset.

In the present application, the following structures are also possible for the shift device according to the first aspect and the vehicle electronic control unit according to the second aspect.

(Additional Remark 1)

That is, in the shift device and the vehicle electronic control unit, an auxiliary battery that is a power supply for supplying electric power to the motor power supply path and the system power supply path and a backup power supply that is a backup power supply for supplying electric power to the motor power supply path and the system power supply path when an abnormality occurs in the auxiliary battery are connected to each of the motor power supply path and the system power supply path. The electric power from the auxiliary battery is supplied to the motor power supply path and the system power supply path during normal operation. When an abnormality occurs in the auxiliary battery, the supply of electric power to the motor power supply path and the system power supply path is switched from the supply from the auxiliary battery to the supply from the backup power supply.

With this structure, the electric power from the auxiliary battery or the backup power supply is supplied to the motor driver unit through the motor power supply path. Therefore, the electric power from the auxiliary battery or the backup power supply is supplied to both the switching unit and the motor driver unit through the motor power supply path. Therefore, both the voltage of the electric power that is supplied to the switching unit and the voltage of the electric power that is supplied to the motor driver unit increase even when the voltage in the motor power supply path that supplies electric power to the switching unit increases with respect to the voltage in the system power supply path that supplies electric power to the control unit when or after the supply of electric power to the motor power supply path and the system power supply path is switched from the supply from the auxiliary battery to the supply from the backup power supply. The possibility that a potential difference may occur between the electric power that is supplied to the switching unit and the electric power that is supplied to the motor driver unit can thus be reduced. Therefore, the switching unit that controls the operation of the motor can be driven even when the voltage in the motor power supply path that supplies electric power to the switching unit increases with respect to the voltage in the system power supply path that supplies electric power to the control unit when or after the supply of electric power to the motor power supply path and the system power supply path is switched from the supply from the auxiliary battery to the supply from the backup power supply.

DESCRIPTION OF EMBODIMENTS

Hereinafter, an embodiment of the present disclosure will be described with reference to the drawings.

Figure 1:
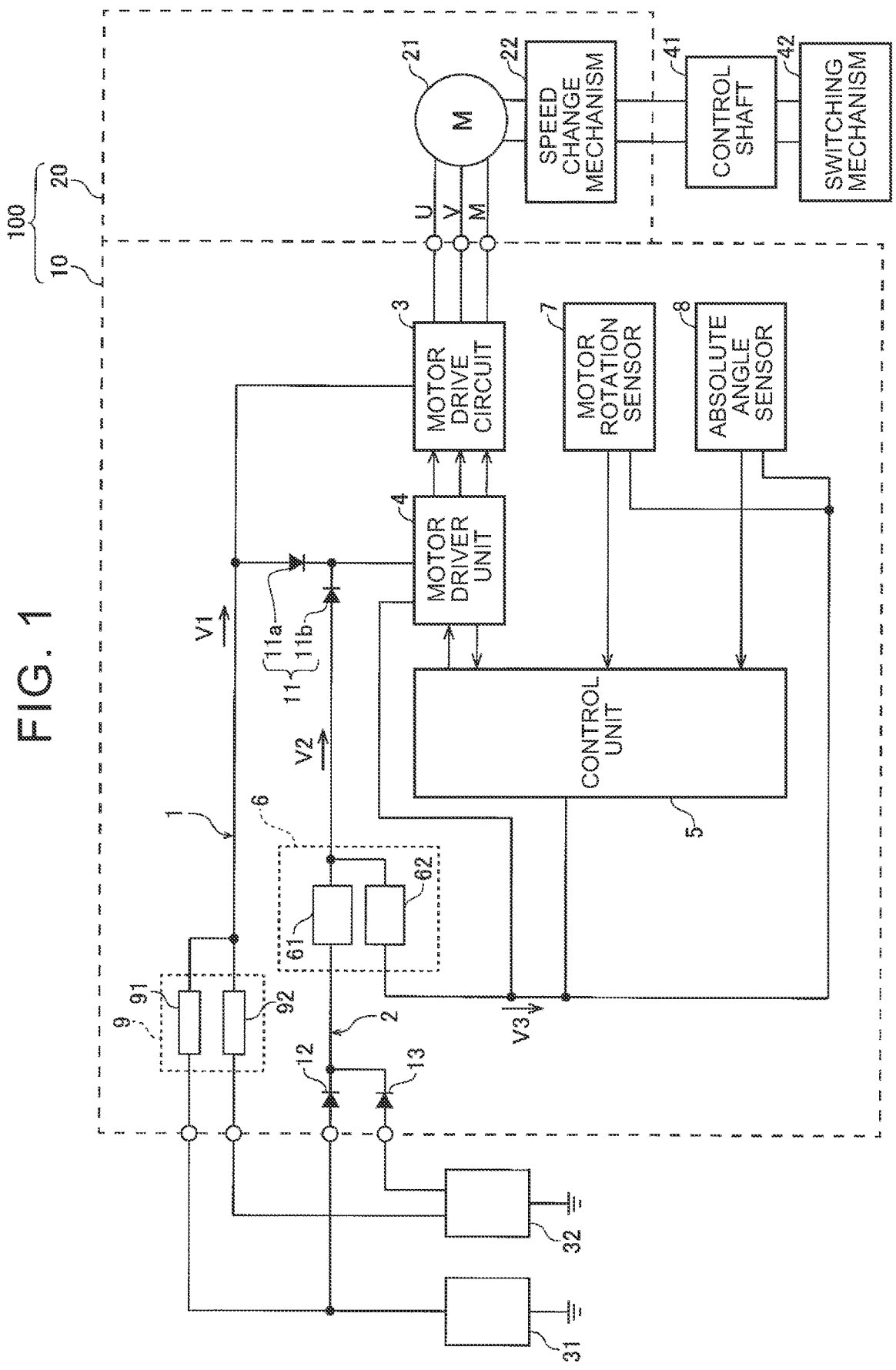
FIG. 1 is a block diagram showing a shift device according to an embodiment of the present disclosure.

A structure of a shift device 100 according to the present embodiment will be described with reference to FIG. 1.

The shift device 100 according to the present embodiment includes an electronic control unit (ECU) unit 10 and an actuator unit 20. The shift device 100 is mounted on a vehicle such as an automobile, and electrical shift switch control is performed in which the shift position (shift range) is switched based on a control signal sent from the ECU unit 10 (control unit 5) in the shift device 100 when an occupant (driver) performs a shift switch operation via a shift lever (or a shift switch) etc. or during autonomous driving. Such shift switch control is called "shift-by-wire (SBW)." That is, the shift device 100 according to the present embodiment is a shift-by-wire shift device for a vehicle. The ECU unit 10 is an example of the "vehicle electronic control unit" in the claims.

In the present embodiment, the ECU unit 10 includes a motor power supply path 1 and a system power supply path 2. The ECU unit 10 includes a motor drive circuit 3, a motor driver unit 4, the control unit 5, and a buck-boost unit 6. The motor drive circuit 3 is an example of the "switching unit" in the claims. The ECU unit 10 further includes a motor rotation sensor 7 and an absolute angle sensor 8. The ECU unit 10 is structured to receive a shift command signal through communication with a main electronic control unit (not shown) that controls the entire vehicle and to perform the shift switch control.

The motor power supply path 1, the system power supply path 2, the motor drive circuit 3, the motor driver unit 4, the control unit 5, the buck-boost unit 6, the motor rotation sensor 7, and the absolute angle sensor 8 are provided on the same circuit board, and are structured as an integrated unit (electronic control unit).

In the present embodiment, the actuator unit 20 includes a motor 21 and a speed change mechanism 22.

The motor 21 is a so-called three-phase motor and has a function to generate a driving force for driving the speed change mechanism 22. The motor 21 drives a control shaft (manual shaft) 41 via the speed change mechanism 22 etc. The control shaft 41 is provided between the speed change mechanism 22 and a switching mechanism 42 of an automatic transmission (AT), and is structured to connect the speed change mechanism 22 and the switching mechanism 42. The switching mechanism 42 is a mechanism for switching between a parking lock state and a parking lock released state.

The shift device 100 is structured to be supplied with electric power from an auxiliary battery 31 or backup power supply 32 outside the shift device 100.

The auxiliary battery 31 is a power supply for supplying electric power to the motor power supply path 1 and system power supply path 2 of the shift device 100 during normal operation. The auxiliary battery 31 includes a lead-acid battery. The auxiliary battery 31 stores electric power generated by a generator (not shown) such as an alternator mounted on the vehicle.

The backup power supply 32 is a backup power supply for supplying electric power to the motor power supply path 1 and system power supply path 2 of the shift device 100 when an abnormality occurs in the auxiliary battery 31. The backup power supply 32 includes a lithium-ion battery or capacitor.

The shift device 100 is structured so that, when an abnormality occurs in the auxiliary battery 31, the supply of electric power to the motor power supply path 1 and the system power supply path 2 is switched from the supply from the auxiliary battery 31 to the supply from the backup power supply 32.

The motor power supply path 1 is a path for supplying electric power (power supply) to the motor drive circuit 3. The motor power supply path 1 is a path for supplying electric power output from the auxiliary battery 31 and backup power supply 32 described above to the motor drive circuit 3.

The system power supply path 2 is a path for supplying electric power (power supply) to the control unit 5. The system power supply path 2 is a path for supplying electric power output from the auxiliary battery 31 and backup power supply 32 described above to the control unit 5.

The motor drive circuit 3 is structured to control the operation of the motor 21 that drives the speed change mechanism 22. The motor drive circuit 3 includes switching elements such as metal oxide semiconductor field effect transistors (MOSFETs) or insulated gate bipolar transistors (IGBTs). For example, the motor drive circuit 3 is a motor drive three-phase circuit including an inverter circuit composed of a total of six MOSFETs, namely three pairs of MOSFETs (switching elements), each pair (two) provided for each of the three phases (U-phase, V-phase, and W-phase). Electric power is supplied from the motor power supply path 1 to the sources or drains of the MOSFETs (switching elements).

The motor driver unit 4 is structured to drive the motor drive circuit 3. The motor driver unit 4 includes a circuit (gate drive circuit) for driving the gates of the switching elements included in the motor drive circuit 3, and is structured to output a gate drive signal to the motor drive circuit 3. The motor driver unit 4 is, for example, a pre-driver IC including a gate drive circuit. When the control unit 5 is initialized (started), the control unit 5 writes and retains settings (register settings) for the shift switch control in the motor driver unit 4 (a register inside the motor driver unit 4). When the control unit 5 is initialized (started), the control unit 5 may write software for the shift switch control in the motor driver unit 4.

The control unit 5 is structured to control the motor driver unit 4. The control unit 5 is structured to output a control signal to the motor driver unit 4. That is, the control unit 5 is structured to control the operation of the motor 21 via the motor driver unit 4 and the motor drive circuit 3. The control unit 5 includes a central processing unit (CPU). The control unit 5 is, for example, a microprocessor (microcomputer) including a CPU, a read only memory (RAM), a random access memory (ROM), and an input and output interface for communicating with the outside.

The buck-boost unit 6 is provided in the system power supply path 2, and is structured to convert electric power supplied from the system power supply path 2 to a predetermined voltage and output the voltage. The buck-boost unit 6 includes a first buck-boost unit 61 and a second buck-boost unit 62. The buck-boost unit 6 (first buck-boost unit 61 and second buck-boost unit 62) includes a buck-boost DC-to-DC converter. The buck-boost unit 6 is, for example, a power supply IC including a buck-boost DC-to-DC converter.

The first buck-boost unit 61 is structured to convert electric power supplied from the system power supply path 2 to a voltage V2 and output the voltage V2. The second buck-boost unit 62 is structured to convert (step down) the electric power converted to the voltage V2 and output by the first buck-boost unit 61 to a voltage V3 lower than the voltage V2 and output the voltage V3. The electric power converted to the voltage V2 by the buck-boost unit 6 (first buck-boost unit 61) is supplied to the motor driver unit 4 as Vdd. That is, the electric power from the system power supply path 2 is supplied to the motor driver unit 4 via the buck-boost unit 6.

The electric power converted to the voltage V3 by the buck-boost unit 6 (first buck-boost unit 61 and second buck-boost unit 62) is supplied to the control unit 5, the motor rotation sensor 7, and the absolute angle sensor 8. That is, the electric power from the system power supply path 2 is supplied to the control unit 5 via the buck-boost unit 6. The electric power converted to the voltage V3 by the buck-boost unit 6 (first buck-boost unit 61 and second buck-boost unit 62) is supplied to the motor driver unit 4 as Vcc.

The motor rotation sensor 7 is structured to detect (acquire) relative position information of rotational displacement (relative angular displacement) of a rotor of the motor 21. The motor rotation sensor 7 includes a magnetic rotation angle sensor IC, and is structured to detect (acquire) relative position information of rotational displacement (relative angular displacement) of the rotor of the motor 21 by a sensor magnet (magnet), not shown, provided in the actuator unit 20.

The absolute angle sensor 8 is structured to detect (acquire) the absolute angle of the control shaft 41. The absolute angle sensor 8 includes a non-contact Hall absolute angle sensor. The absolute angle sensor 8 may include a sensor other than the Hall absolute angle sensor. The absolute angle sensor 8 may include, for example, a magnetic rotation angle sensor IC, and may be structured to detect (acquire) the angle of the control shaft 41 by a sensor magnet (magnet), not shown.

Signals indicating the relative position information of rotational displacement and the rotor rotation speed of the rotor of the motor 21 are sent (supplied) from the motor rotation sensor 7 to the control unit 5, and a signal indicating the absolute angle of the control shaft 41 is supplied from the absolute angle sensor 8 to the control unit 5. The control unit determines whether the switch position of the switching mechanism 42 is the position of the parking lock state or the position of the parking lock released state, based on the relative position information of rotational displacement (relative angle displacement) of the rotor of the motor 21 detected by the motor rotation sensor 7 and the absolute angle of the control shaft 41 detected by the absolute angle sensor 8.

A relay unit 9 for electrically disconnecting the auxiliary battery 31 and backup power supply 32 provided outside the shift device 100 from the motor drive circuit 3 (motor power supply path 1) is provided on the auxiliary battery 31 side (backup power supply 32 side) of the motor power supply path 1. The relay unit 9 includes a first relay 91 and a second relay 92. In the present embodiment, each of a power supply path for supplying electric power from the auxiliary battery 31 and a power supply path for supplying electric power from the backup power supply 32 branches outside the shift device 100. Each of the electric power supplied from the auxiliary battery 31 and the electric power supplied from the backup power supply 32 is individually input to the shift device 100 (ECU unit 10) for each of the motor power supply path 1 and the system power supply path 2 inside the shift device 100 (ECU unit 10).

The first relay 91 is structured to electrically disconnect the auxiliary battery 31 from the motor drive circuit 3 (motor power supply path 1). The second relay 92 is structured to electrically disconnect the backup power supply 32 from the motor drive circuit 3 (motor power supply path 1). The first relay 91 and the second relay 92 are, for example, switching circuits including MOSFETs.

In the present embodiment, the motor power supply path 1 and the output side of the buck-boost unit 6 are connected to each other via a diode 11.

The diode 11 includes a diode 11*a* provided in the motor power supply path 1 and a diode 11*b* provided on the output side of the buck-boost unit 6. The diode 11*a* is an example of the "first diode" in the claims, and the diode 11*b* is an example of the "second diode" in the claims.

In the present embodiment, the motor driver unit 4 is structured so that it can be supplied with electric power from either the motor power supply path 1 or the output of the buck-boost unit 6 by a diode-OR circuit composed of the diode 11*a* and the diode 11*b*.

A diode 12 for preventing backflow to the auxiliary battery 31 is provided in the system power supply path 2 between the buck-boost unit 6 and the auxiliary battery 31. A diode 13 for preventing backflow to the backup power supply 32 is provided in the system power supply path 2 between the buck-boost unit 6 and the backup power supply 32.

(Power Supply to Motor Driver Unit)

Either the electric power from the motor power supply path 1 or the electric power from the system power supply path 2 is supplied to the motor driver unit 4 based on the voltage. That is, the electric power from the motor power supply path 1 can be supplied to the motor driver unit 4. In the present embodiment, either the electric power from the motor power supply path 1 or the electric power output from the buck-boost unit 6 is supplied to the motor driver unit 4 based on the voltage. The motor driver unit 4 is structured to drive the motor drive circuit 3 based on the electric power supplied from either the electric power supplied from the motor power supply path 1 or the electric power output from the buck-boost unit 6.

Either the electric power from the motor power supply path 1 and via the diode 11*a* or the electric power output from the buck-boost unit 6 and via the diode 11*b* is supplied to the motor driver unit 4 via the diode 11 (diode 11*a* or 11*b*) based on the voltage.

Specifically, when the voltage V1 in the motor power supply path 1 is higher than the voltage V2 output from the buck-boost unit 6, the electric power from the motor power supply path 1 is supplied to the motor driver unit 4 via the diode 11*a*. The voltage V1 is an example of the "first voltage" in the claims, and the voltage V2 is an example of the "second voltage" in the claims.

"When the voltage V1 in the motor power supply path 1 is higher than the voltage V2 output from the buck-boost unit 6" includes when the voltage V2 becomes 0 V due to a momentary power interruption (phenomenon in which supply of electric power is momentarily interrupted) etc. In such a case, the electric power of the voltage V1 is supplied from the motor power supply path 1 to the motor driver unit 4.

When the voltage V1 in the motor power supply path 1 is lower than the voltage V2 output from the buck-boost unit 6, the electric power converted to the voltage V2 by the buck-boost unit 6 is supplied to the motor driver unit 4 via the diode 11*b*.

"When the voltage V1 in the motor power supply path 1 is lower than the voltage V2 output from the buck-boost unit 6" includes when the voltage V1 in the motor power supply path 1 becomes 0 V due to a momentary power interruption etc. In such a case, the electric power of the voltage V2 supplied from the system power supply path 2 and output from the first buck-boost unit 61 is supplied to the motor driver unit 4.

That is, when a momentary power interruption occurs in the motor power supply path 1, electric power is supplied to the motor driver unit 4 and the control unit 5 via the buck-boost unit 6. Therefore, both the motor driver unit 4 and the control unit 5 can keep operating even when a momentary power interruption occurs in the motor power supply path 1.

When the shift device 100 (ECU unit 10) is started, the auxiliary battery 31 and the backup power supply 32 are electrically disconnected from the motor drive circuit 3 (motor power supply path 1) by the relay unit 9. In the present embodiment, either the electric power from the motor power supply path 1 or the electric power output from the buck-boost unit 6 is supplied to the motor driver unit 4 based on the voltage. Accordingly, even when the auxiliary battery 31 and the backup power supply 32 are electrically disconnected from the motor drive circuit 3 (motor power supply path 1) by the relay unit 9, the electric power supplied from the system power supply path 2 and output from the buck-boost unit 6 can be supplied to the motor driver unit 4 and the control unit 5.

The following effects can be obtained in the present embodiment.

In the present embodiment, as described above, either the electric power from the motor power supply path 1 or the electric power from the system power supply path 2 (buck-boost unit 6) is supplied to the motor driver unit 4 for driving the motor drive circuit 3 of the shift device 100 (ECU unit 10), based on the voltage. Accordingly, by supplying the electric power from the motor power supply path 1 to the motor driver unit 4, the electric power from the motor power supply path 1 is supplied to both the motor drive circuit 3 and the motor driver unit 4. Therefore, even when the voltage V1 in the motor power supply path 1 that supplies electric power to the motor drive circuit 3 increases with respect to the voltage in the system power supply path 2 that supplies electric power to the control unit 5, both the voltage of the electric power that is supplied to the motor drive circuit 3 and the voltage of the electric power that is supplied to the motor driver unit 4 increase. The possibility that a potential difference may occur between the electric power that is supplied to the motor drive circuit 3 and the electric power that is supplied to the motor driver unit 4 can thus be reduced. As a result, the motor drive circuit 3 that controls the operation of the motor 21 can be driven even when the voltage V1 in the motor power supply path 1 that supplies electric power to the motor drive circuit 3 increases with respect to the voltage in the system power supply path 2 that supplies electric power to the control unit 5. That is, the ECU unit 10 can drive the motor drive circuit 3 and control the operation of the motor 21 even when the voltage V1 in the motor power supply path 1 increases with respect to the voltage in the system power supply path 2.

In the present embodiment, as described above, either the electric power from the motor power supply path 1 or the electric power from the system power supply path 2 (buck-boost unit 6) is supplied to the motor driver unit 4 based on the voltage. Therefore, even if an abnormality occurs in one of the power supply paths, electric power can be supplied to the motor driver unit 4 from the other power supply path. As a result, the motor driver unit 4 can be kept operating even if an abnormality occurs in one of the power supply paths. Therefore, an abnormality can be prevented from occurring in the motor driver unit 4 due to the motor driver unit 4 being reset.

In the present embodiment, as described above, either the electric power from the motor power supply path 1 or the electric power output from the buck-boost unit 6 is supplied to the motor driver unit 4 based on the voltage. Accordingly, by supplying the electric power output from the buck-boost unit 6 to the motor driver unit 4, the electric power supplied from the system power supply path 2 can be supplied to both the motor driver unit 4 and the control unit 5 via the buck-boost unit 6. As a result, the shift device 100 (shift-by-wire shift device for a vehicle) can be provided that can keep both the motor driver unit 4 and the control unit 5 operating even when a momentary power interruption occurs in the motor power supply path 1.

In the present embodiment, as described above, when the voltage V1 in the motor power supply path 1 is higher than the voltage V2 output from the buck-boost unit 6, the electric power from the motor power supply path 1 is supplied to the motor driver unit 4. Therefore, when the voltage V1 in the motor power supply path 1 is higher than the voltage V2 output from the buck-boost unit 6, the voltage V1 from the motor power supply path 1 is supplied to the motor drive circuit 3 and the motor driver unit 4. Therefore, even when the voltage V1 in the motor power supply path 1 increases and the voltage V1 in the motor power supply path 1 becomes higher than the voltage V2 output from the buck-boost unit 6, the electric power of the voltage V1 from the motor power supply path 1 is supplied to the motor drive circuit 3 and the motor driver unit 4. Since the voltage of the electric power that is supplied to the motor driver unit 4 thus increases with the voltage of the electric power that is supplied to the motor drive circuit 3, the possibility that a potential difference may occur between the electric power that is supplied to the motor driver unit 4 and the electric power that is supplied to the motor drive circuit 3 can be easily reduced. As a result, the motor drive circuit 3 that controls the operation of the motor 21 can be easily driven even when the voltage V1 in the motor power supply path 1 becomes higher than the voltage V2 output from the buck-boost unit 6.

In the present embodiment, as described above, when the voltage V1 in the motor power supply path 1 is lower than the voltage V2 output from the buck-boost unit 6, the electric power converted to the voltage V2 by the buck-boost unit 6 is supplied to the motor driver unit 4. Therefore, it is possible to keep supplying the electric power to the motor driver unit 4 even when the voltage V2 in the motor power supply path 1 drops due to a momentary power interruption (phenomenon in which supply of electric power is momentarily interrupted) etc. As a result, the motor driver unit 4 can be kept operating even when the supply of electric power from the motor power supply path 1 stops due to a momentary power interruption etc. Therefore, an abnormality can be prevented from occurring in the motor driver unit 4 due to the motor driver unit 4 being reset In the present embodiment, as described above, the diode-OR circuit can be formed by the diode 11a provided in the motor power supply path 1 and the diode 11b provided on the output side of the buck-boost unit 6. Therefore, the electric power to be supplied to the motor driver unit 4 can be switched based on the magnitude of the voltage without separately providing a switching circuit etc. for switching the electric power to be supplied to the motor driver unit 4. As a result, the circuit structure is less likely to be complicated as compared to the case where a switching circuit etc. for switching the electric power to be supplied to the motor driver unit 4 is provided separately.

(Modifications)

The embodiment disclosed herein should be construed as illustrative in all respects and not restrictive. The scope of the present invention is defined by the claims rather than by the above description of the embodiment, and includes all changes (modifications) that fall within the meaning and scope equivalent to the claims.

For example, in the above embodiment, the ECU unit 10 (vehicle electronic control unit) is provided in the shift-by-wire shift device 100 for a vehicle. However, the present invention is not limited to this. The vehicle electronic control unit of the present disclosure may be used in devices other than a shift device for a vehicle, as long as they are devices in which a potential difference occurs between a motor power supply path and a system power supply path.

Figure 2:
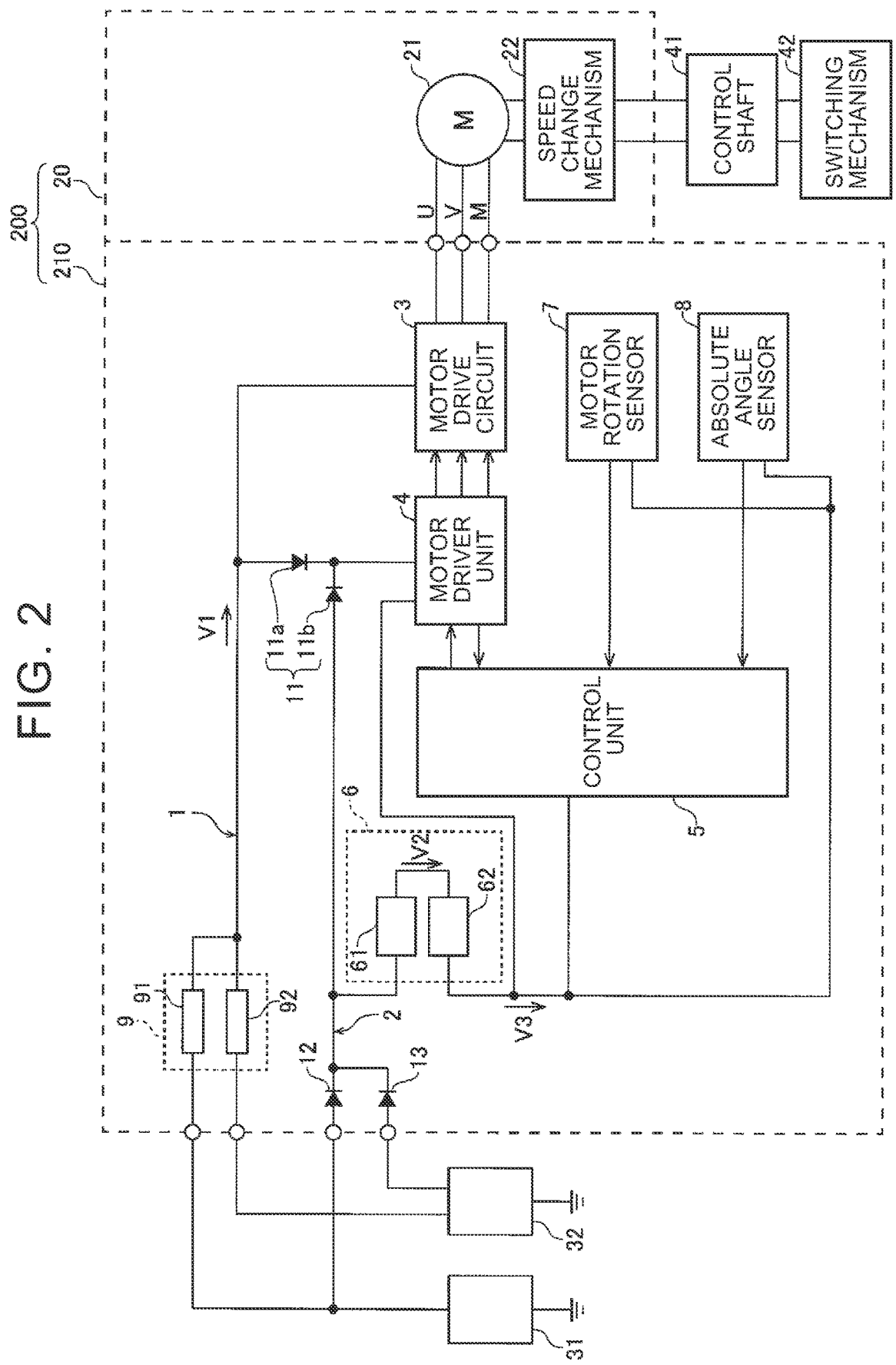
FIG. 2 is a block diagram showing a first modification of the shift device according to the embodiment of the present disclosure.

The above embodiment illustrates an example in which electric power is supplied to the control unit 5 via the buck-boost unit 6. However, the present disclosure is not limited to this. In the present disclosure, like a shift device 200 according to a first modification shown in FIG. 2, the electric power from the system power supply path 2 may be supplied to the control unit 5 without via the buck-boost unit 6 provided in an ECU unit 210. In this case, when the voltage V1 in the motor power supply path 1 is higher than the voltage in the system power supply path 2, the electric power from the motor power supply path 1 is supplied to the motor driver unit 4, and when the voltage V1 in the motor power supply path 1 is lower than the voltage in the system power supply path 2, the electric power from the system power supply path 2 is supplied to the motor driver unit 4. The ECU unit 210 is an example of the "vehicle electronic control unit" in the claims.

The above embodiment illustrates an example in which either the electric power from the motor power supply path 1 or the electric power output from the buck-boost unit 6 is supplied to the motor driver unit 4 based on the voltage. However, the present disclosure is not limited to this. In the present disclosure, both the electric power from the motor power supply path and the power output from the buck-boost unit may be simultaneously supplied to the motor driver unit.

The above embodiment illustrates an example in which the electric power to be supplied to the motor driver unit 4 is switched based on the magnitude of the voltage without separately providing a switching circuit etc. for switching the electric power to be supplied to the motor driver unit 4. However, the present disclosure is not limited to this. In the present disclosure, a switching circuit etc. for switching between connection and disconnection of a power supply path based on the magnitude of the voltage may be provided to switch the electric power to be supplied to the motor driver unit.

Figure 3:
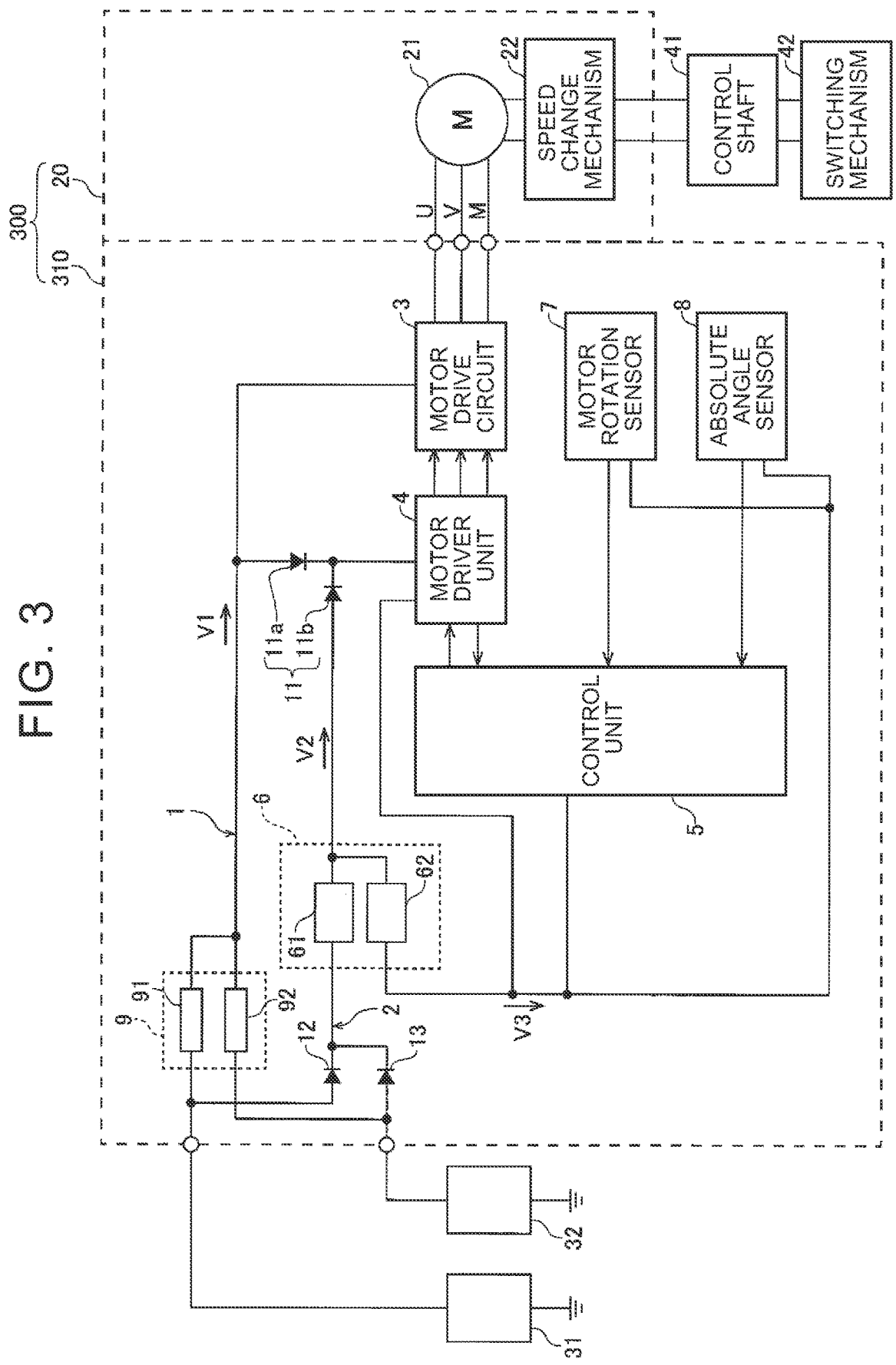
FIG. 3 is a block diagram showing a second modification of the shift device according to the embodiment of the present disclosure.

The above embodiment illustrates an example in which the power supply path for supplying electric power from the backup power supply 32 branches outside the shift device 100 (see FIG. 1) so that the electric power supplied from the backup power supply 32 is individually input to the shift device 100 (ECU unit 10) for each of the motor power supply path 1 and the system power supply path 2 inside the shift device 100 (ECU unit 10). However, the present disclosure is limited to this. In the present disclosure, like a shift device 300 (ECU unit 310) according to a second modification shown in FIG. 3, the power supply path for supplying the electric power from the backup power supply 32 located outside the shift device 300 may be structured to branch inside the shift device 300 (ECU unit 310) into the motor power supply path 1 and the system power supply path 2. Accordingly, in the shift device 300 according to the second modification, unlike the case where the current path for supplying the electric power from the backup power supply 32 located outside the shift device 300 branches outside the shift device 300 into the motor power supply path 1 and the system power supply path 2 inside the shift device 300, terminals for inputting the electric power from the backup power supply 32 located outside the shift device 300 need not be provided for each of the motor power supply path 1 and the system power supply path 2. As a result, an increase in number of parts can be reduced. The ECU unit 310 is an example of the "vehicle electronic control unit" in the claims, and the backup power supply 32 is an example of the "power supply outside the device" in the claims. In the shift device 300 according to the second modification according to the second modification as well, the motor drive circuit 3 that controls the operation of the motor 21 can be driven even when the voltage V1 in the motor power supply path 1 that supplies electric power to the motor drive circuit 3 increases with respect to the voltage in the system power supply path 2 that supplies electric power to the control unit 5 due to the regenerative power of the motor 21 etc.

The above embodiment illustrates an example in which the power supply path for supplying electric power from the auxiliary battery 31 branches outside the shift device 100 (see FIG. 1) so that the electric power supplied from the auxiliary battery 31 is individually input to the shift device 100 (ECU unit 10) for each of the motor power supply path 1 and the system power supply path 2 inside the shift device 100 (ECU unit 10). However, the present disclosure is limited to this. In the present disclosure, like the shift device 300 (ECU unit 310) according to the second modification shown in FIG. 3, the power supply path for supplying the electric power from the auxiliary battery 31 located outside the shift device 300 may be structured to branch inside the shift device 300 (ECU unit 310) into the motor power supply path 1 and the system power supply path 2. Accordingly, unlike the case where the current path for supplying the electric power from the auxiliary battery 31 located outside the shift device 300 branches outside the shift device 300 into the motor power supply path 1 and the system power supply path 2 inside the shift device 300, terminals for inputting the electric power from the auxiliary battery 31 located outside the shift device 300 need not be provided for each of the motor power supply path 1 and the system power supply path 2. As a result, an increase in number of parts can be reduced. The auxiliary battery 31 is an example of the "power supply outside the device" in the claims.

DESCRIPTION OF THE REFERENCE NUMERALS

1 Motor Power Supply Path
2 System Power Supply Path
3 Motor Drive Circuit (Switching Unit)
4 Motor Driver Unit
Control Unit
6 Buck-Boost Unit
10, 210, 310 ECU Unit (Vehicle Electronic Control Unit)
11 Diode
11a Diode (First Diode)
11b Diode (Second Diode)
21 Motor
22 Speed Change Mechanism
31 Auxiliary Battery (Power Supply Outside Device)
32 Backup Power Supply (Power Supply Outside Device)
100, 200, 300 Shift Device
V1 Voltage (First Voltage)
V2 Voltage (Second Voltage)

The invention claimed is:
1. A shift device, comprising:
a switching unit that controls operation of a motor that drives a speed change mechanism;
a motor driver unit for driving the switching unit;
a control unit that controls the motor driver unit;
a motor power supply path that supplies electric power to the switching unit;

a system power supply path that supplies electric power to the control unit; and a buck-boost unit that is provided in the system power supply path and that converts the electric power supplied from the system power supply path to a predetermined voltage and output the voltage, wherein electric power is supplied to the control unit via the buck-boost unit, and the electric power supplied to the motor driver unit is changed from the system power supply path to the motor power supply path based on a voltage.

2. The shift device according to claim 1, wherein the shift device is a shift-by-wire shift device for a vehicle, and either the electric power from the motor power supply path or the electric power output from the buck-boost unit is supplied to the motor driver unit based on the voltage.

3. The shift device according to claim 2, wherein when a first voltage in the motor power supply path is higher than a second voltage output from the buck-boost unit, the electric power from the motor power supply path is supplied to the motor driver unit.

4. The shift device according to claim 3, wherein when the first voltage in the motor power supply path is lower than the second voltage output from the buck-boost unit, electric power converted to the second voltage by the buck-boost unit is supplied to the motor driver unit.

5. The shift device according to claim 1, wherein the motor power supply path and an output side of the buck-boost unit are connected to each other via a diode, the diode includes a first diode provided in the motor power supply path and a second diode provided on the output side of the buck-boost unit, and either the electric power from the motor power supply path and via the first diode or the electric power output from the buck-boost unit and via the second diode is supplied to the motor driver unit via the diode based on the voltage.

6. The shift device according to claim 1, wherein a current path for supplying electric power from a power supply outside the device branches inside the device into the motor power supply path and the system power supply path.

7. A vehicle electronic control unit, comprising:

a switching unit that controls operation of a motor;

a motor driver unit for driving the switching unit;

a control unit that controls the motor driver unit;

a motor power supply path that supplies electric power to the switching unit;

a system power supply path that supplies electric power to the control unit; and a buck-boost unit that is provided in the system power supply path and that converts the electric power supplied from the system power supply path to a predetermined voltage and output the voltage, wherein electric power is supplied to the control unit via the buck-boost unit, and the electric power supplied to the motor driver unit is changed from the system power supply path to the motor power supply path based on a voltage.

* * * * *